May 30, 1967 — H. W. LORD — 3,323,013
SYSTEMS AND BALLAST APPARATUS FOR OPERATING
FLUORESCENT LAMPS AT PRESELECTED
LEVELS OF ILLUMINATION
Filed Nov. 30, 1964 — 4 Sheets-Sheet 1

POSITION 1    POSITION 2    POSITION 3

INVENTOR.
Harold W. Lord,
BY Henry J. Wrcinski
Attorney.

May 30, 1967

H. W. LORD 3,323,013

SYSTEMS AND BALLAST APPARATUS FOR OPERATING
FLUORESCENT LAMPS AT PRESELECTED
LEVELS OF ILLUMINATION

Filed Nov. 30, 1964

INVENTOR.
Harold W. Lord,
BY
Attorney.

Inventor:
Harold W. Lord,
by Henry J. [Attorney signature]
Attorney.

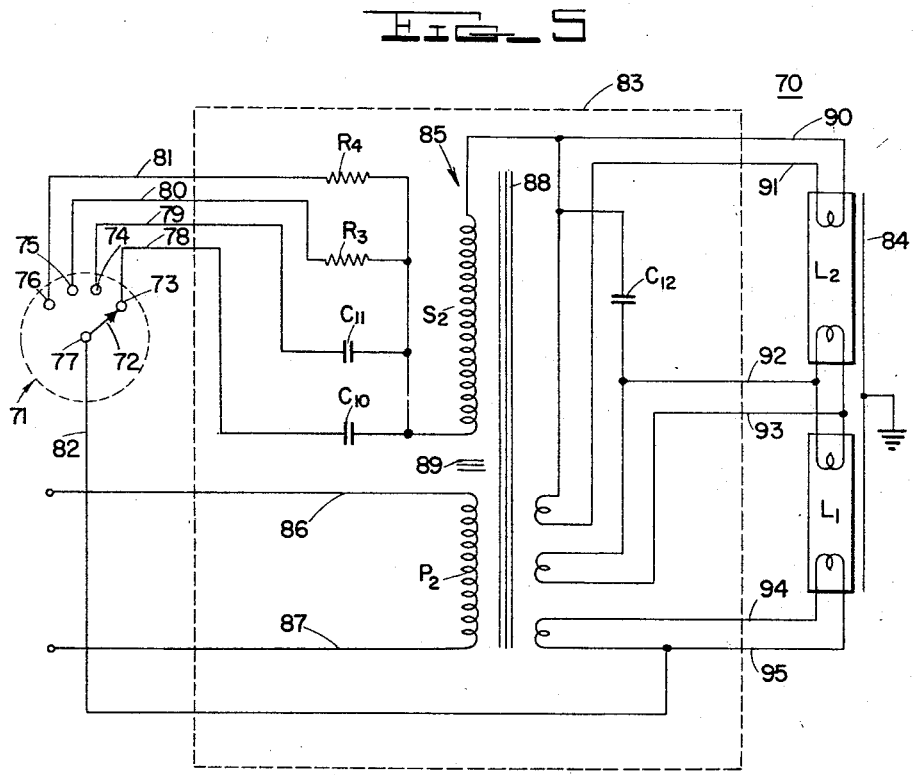

United States Patent Office 3,323,013
Patented May 30, 1967

3,323,013
SYSTEMS AND BALLAST APPARATUS FOR OPERATING FLUORESCENT LAMPS AT PRESELECTED LEVELS OF ILLUMINATION
Harold W. Lord, Schenectady, N.Y., assignor to General Electric Company, a corporation of New York
Filed Nov. 30, 1964, Ser. No. 414,741
7 Claims. (Cl. 315—187)

This is a continuation-in-part of application Ser. No. 184,227 filed on Apr. 2, 1962, now abandoned and relates to systems and ballast apparatus for operating fluorescent lamps. More particularly, it relates to such systems and ballast apparatus for operating fluorescent lamps at two or more preselected levels of illumination.

The illumination level of a hot cathode fluorescent lamp may be changed by varying the average value of current supplied to the lamp. For example, when the average value of the current supplied to a hot cathode fluorescent lamp is decreased, the activation level of the phosphor coating of the fluorescent lamp is decreased, and the fluorescent lamp may be operated at a selectively variable illumination level. At any selected level of illumination it is, of course, necessary that the ballast provide the means for limiting lamp current because of the inherent negative resistive characteristic of the fluorescent lamp.

Various arrangements for dimming fluorescent lamps have been proposed and used in the past. Phase controlled switching networks employing silicon controlled rectifiers and thyratrons have been used in combination with a ballast apparatus to control the interval of current conduction to the fluorescent lamp in each half cycle. Such systems when used in conjunction with properly designed ballast apparatus can reliably operate fluorescent lamps over a wide dimming range. Although these dimming systems have been eminently satisfactory, the initial cost is relatively high and in some applications the wide range of dimming obtainable by these systems is not necessary and may not always be desirable.

Other dimming systems which have been employed in the past usually required the use of an autotransformer or a variable reactor connected externally of the ballast apparatus. Since inductive devices such as autotransformers and reactors generate heat during operation, these devices cannot be conveniently mounted within an enclosure such as a regular wall box. Generally, the autotransformer or reactor is mounted in an exposed location such as the outer surface of a wall so that heat generated can be readily dissipated to the ambient environment. Although these systems may be less expensive than dimming systems employing electronic switches such as thyratrons or silicon controlled rectifiers and have been satisfactorily employed in particular applications, a bulky and relatively expensive control autotransformer or variable reactor is required to operate the fluorescent lamps at various illumination levels.

There is a need, therefore, for a low cost reliable ballast apparatus which can selectively operate fluorescent lamps at one or more levels of illumination and which does not require relatively expensive components such as electronic switches, autotransformers or variable reactors to vary the light output of fluorescent lamps. In applications such as residential lighting, frequently it is not necessary to provide a wide range of dimming levels. As in the commonly used three-way incandescent lamp, it may be desirable to provide a ballast apparatus which can be selectively switched to provide three different levels of illumination for a fluorescent lamp.

Accordingly, it is an object of the present invention to provide an improved ballast for use in conjunction with manually operated switch to selectively change the luminous levels of one or more fluorescent lamps.

It is another object of the present invention to provide a ballast apparatus for use in conjunction with a switching means wherein the fluorescent lamp or lamps operated by the ballast apparatus can be selectively switched from one illumination level to one or more other preselected levels of illumination.

Still another object of the present invention is to provide an improved ballast apparatus that is economical to manufacture and does not require the use of an externally connected inductive device to provide preselected levels of illumination.

It is a further object of the invention to provide an improved system for operating a plurality of fluorescent lamps at preselected levels of illumination.

In accordance with one form of my invention, I have provided an improved system and ballast apparatus for operating one or more fluorescent lamps at preselected levels of illumination. In the system a switching means is used in conjunction with the improved ballast apparatus to attain the variable level lamp operation. The ballast apparatus includes a ballast transformer having a primary winding and a secondary winding coupled on a magnetic core, and a plurality of impedance elements connected at one end thereof in circuit with the secondary winding. The transformer and the impedance elements are disposed within a suitable housing such as a metallic case or an encapsulating medium. At least one lead is connected in circuit with the other end of one of the impedance elements and is brought out externally of the ballast apparatus for connection with the switching means. The switching means serves to selectively connect the impedance element or elements from which the leads are brought out in series circuit relation with the secondary winding to change the level of illumination of the fluorescent lamp operated by the ballast apparatus. Preferably, the impedance elements should be capacitive elements to permit the changes in lamp illumination to be made with relatively little heat generation.

The subject matter which I regard as my invention is set forth in the appended claims. The invention itself, however, together with further objects and advantages thereof may be better understood by referring to the following description taken in connection with the accompanying drawings in which:

Figure 3:
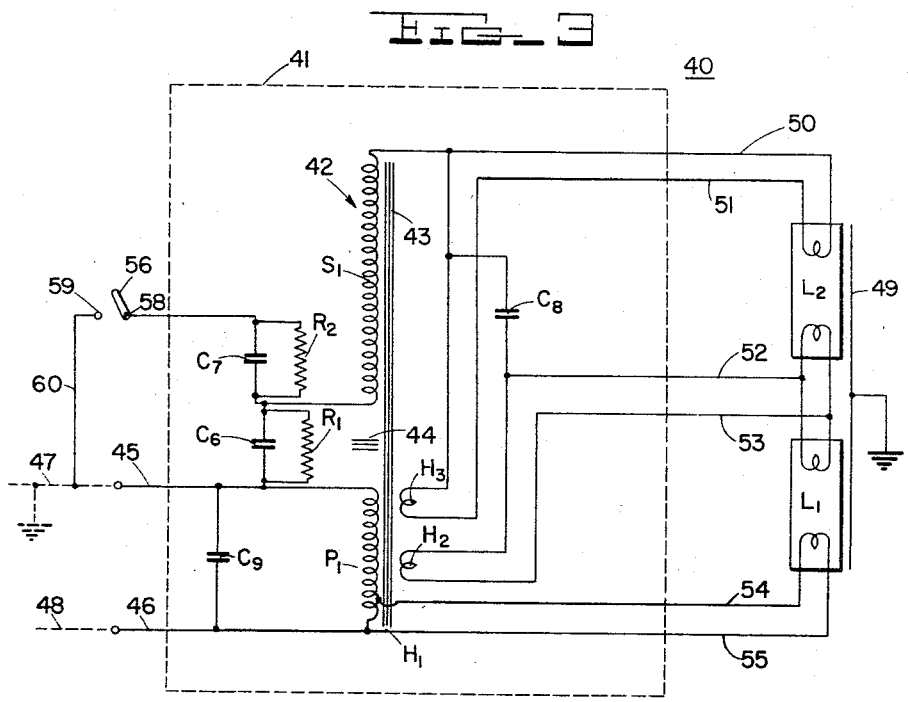
FIGURE 3 is a schematic circuit diagram of another embodiment of the invention.
Figure 4:
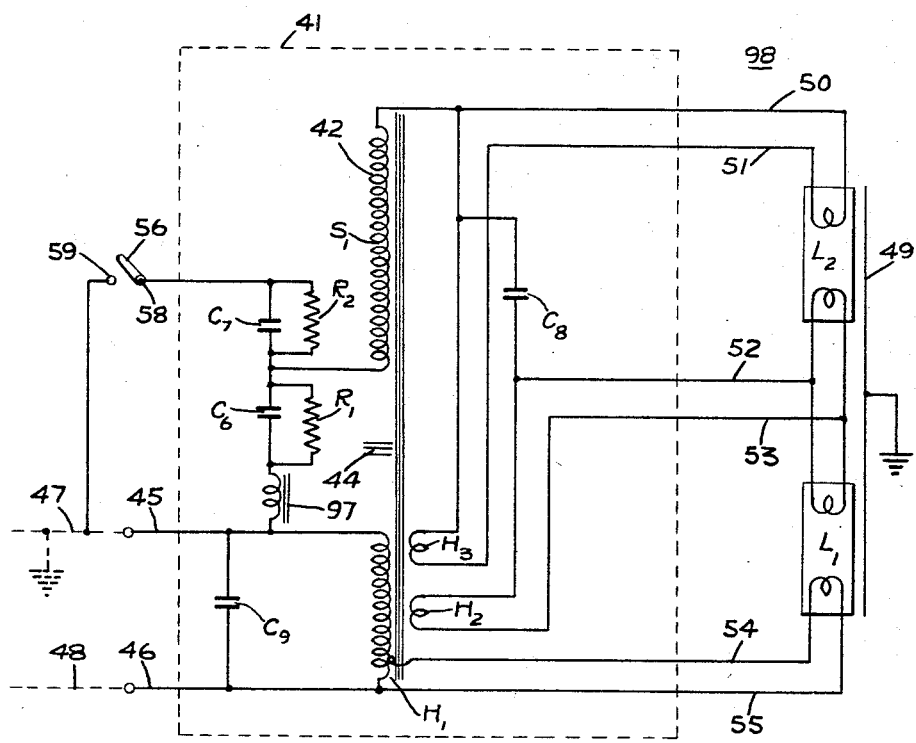

FIGURE 4 is a schematic circuit digram of the ballast apparatus shown in FIGURE 3 disclosing a modification wherein a separate reactor is utilized in series circuit with one of the capacitors to provide a stable operation of the fluorescent lamps at low dimming levels; and FIGURE 5 is a schematic circuit diagram showing another form of the invention wherein a resistor is used as an impedance element at low illumination levels.

Figure 1:
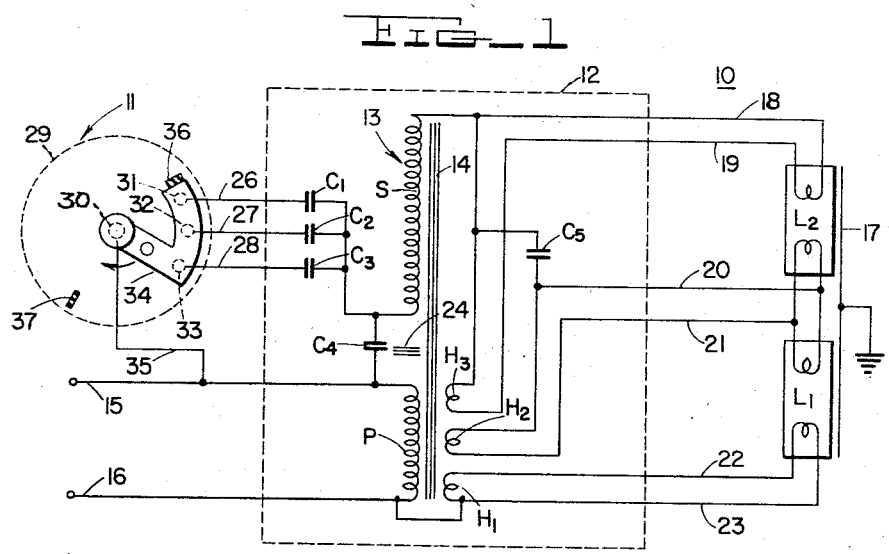
FIGURE 1 is a schematic circuit diagram of one embodiment of my invention.

Referring now to FIGURE 1 of the drawings, I have illustrated therein a ballast apparatus 10 incorporating one form of my invention wherein a plurality of impedance elements, such as capacitors $C_1$, $C_2$ and $C_3$ connected in parallel branches with a fourth capacitor $C_4$, are successively switched out of the ballast circuit by a switch 11 to provide four preselected levels of illumination. The ballast apparatus 10 is shown enclosed in a dashed rectangle which schematically represents the ballast case 12 or other enclosure means such as an encapsulant.

The voltage transforming and current limiting function of the ballast apparatus 10 is carried out by a conventional high reactance ballast transformer 13. The high reactance ballast transformer 13 includes a primary winding P and a secondary winding S inductively coupled with the primary winding P on a magnetic core 14. Cathode heating windings $H_1$, $H_2$ and $H_3$ are closely coupled with the primary winding P, and provide continuous heating current to a pair of fluorescent lamps $L_1$ and $L_2$ when the ballast apparatus 10 is energized. A pair of input terminal leads 15 and 16 connected across the primary winding P are provided for connection to a suitable alternating power supply (not shown), such as a 60 cycle, 115 volt supply.

Lamps $L_1$ and $L_2$, which are fluorescent lamps of the hot cathode type, are preferably positioned in close proximity to a grounded conductive fixture 17 so that lamps $L_1$, $L_2$ are disposed in capacitive relationship therewith in order to facilitate starting. A plurality of output leads 18, 19, 20, 21, 22 and 23 is brought out externally of the ballast case 12 to apply the output of ballast apparatus 10 to lamps $L_1$ and $L_2$.

A starting capacitor $C_5$ is connected across lamp $L_2$ in a well-known shunting arrangement so that the open circuit voltage is initially applied across lamp $L_1$, which is the first lamp to be ignited. If desired, a bleeder resistor (not shown) may be connected across the starting capacitor $C_5$ to cause the charge to be bled off the capacitor $C_5$ when the power supplied to ballast apparatus 10 is cut off.

To provide a path for leakage flux, a magnetic shunt 24 is interposed between the primary winding P and the secondary winding S. Although shunts of magnetic material were used in the illustrated embodiment of the invention, it will be appreciated that shunts of nonmagnetic material such as air may also be used to provide a leakage path for magnetic flux.

It will be noted that when switch 11 is in the position as shown in FIGURE 1, the capacitors $C_1$, $C_2$, $C_3$ and $C_4$ are connected in parallel circuit relation with each other and in series circiut relation with the secondary winding S. Capacitor $C_4$ is not switched in and out of this circuit since it is permanently connected to the secondary winding S and primary winding P. Leads 26, 27 and 28, which are connected to one end of capacitors $C_1$, $C_2$ and $C_3$ respectively, are brought out externally from the ballast case 12 for connection to a suitable switching means such as the rotary switch 11 which I have shown schematically in FIGURES 1 and 2.

Rotary switch 11 is comprised of a suitable enclosure 29 shown schematically by the dashed circle, a plurality of terminals 30, 31, 32 and 33, and a rotatable switch arm 34 which selectively joins terminal 30 in electrical circuit with terminals 31, 32 and 33, to which the leads 26, 27 and 28 are connected. Although terminal 30 of switch 11 is connected in circuit with the input terminal lead 15 by an electrical lead 35, it will be appreciated that lead 35 may be connected at other locations to the side of the power supply line to which input terminal lead 15 of the ballast apparatus 10 is connected. Further, it will be seen that the rotation of switch arm 34 is limited by a pair of stops 36 and 37 made of insulating material.

When switch 11 is in the position shown in FIGURE 1, the switch arm 34 butts against the stop 36, and terminals 31, 32 and 33 are connected in electrical circuit with terminal 30 and in circuit with the side of power supply to which input terminal lead 15 is connected. For this position of switch 11, all four of the capacitors $C_1$, $C_2$, $C_3$ and $C_4$ are connected in circuit between the primary winding P and the secondary winding S, and the lamps $L_1$ and $L_2$ are operated at a level of maximum illumination. Further, it will be noted that in this switch position the capacitors $C_1$, $C_2$, $C_3$ and $C_4$ are connected in parallel branches with each other, and in series circuit relation with the primary winding P and the secondary winding S across the output leads 18, 19 and 22, 23.

Figure 2:
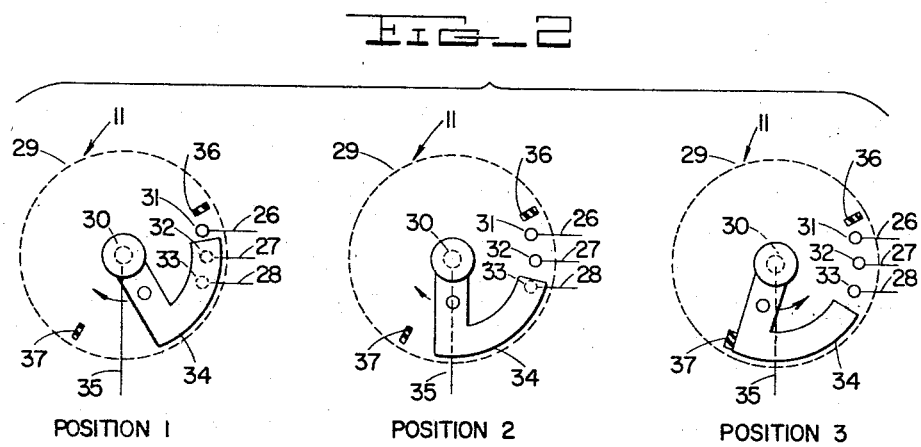
FIGURE 2 is a schematic circuit diagram showing various positions of the switch used in the circuit illustrated in FIGURE 1 that will provide different levels of illumination for the lamps operated by my improved ballast apparatus.

Referring now to FIGURE 2, it will be seen that when the switch 11 is rotated in a clockwise direction to Position 1 as shown therein, the switch arm 34 is disengaged from electrical contact with terminal 31 and consequently capacitor $C_1$ is disconnected from the circuit. Thus, lamps $L_1$ and $L_2$ are operated at a second preselected level of illumination. When the switch 11 is rotated to Position 2 as shown in FIGURE 2, terminals 31 and 32 and leads 26, 27 connected in circuit therewith are disconnected from the bailast apparatus 10. In this position of switch 11, only capacitors $C_3$ and $C_4$ are connected in circuit with the secondary winding S and the primary winding P, and lamps $L_1$ and $L_2$ are operated at a third preselected level of illumination. In Position 3 as shown in FIGURE 2, switch 11 is open, and none of the terminals 31, 32 or 33 are connected in circuit with terminal 30. When the switch 11 is in the "open" position, it will be seen from schematic circuit diagram of FIGURE 1 that only capacitor $C_4$ is connected in circuit between the primary winding P and secondary winding S. Accordingly, lamps $L_1$ and $L_2$ are operated at a fourth preselected level of illumination.

From the foregoing description of the ballast apparatus 10 shown in FIGURE 1, it will be apparent that for normal illumination levels all four capacitors $C_1$, $C_2$, $C_3$ and $C_4$ may be utilized in the operating circuit. The capacitors $C_1$, $C_2$ and $C_3$ are selectively switched out of the operating circuit to provide the desired levels of illumination. The capacitive values to be employed for a desired level of illumination can be readily ascertained by using a variable capacitor and adjusting the capacitance in the circuit until the desired level of illumination is obtained.

By way of illustration, in a ballast apparatus for starting two 40 watt rapid start fluorescent lamps, it was found that the lamp current could readily be varied over a wide range of values by changing the net capacitance in series with the lamp to provide four distinct steps of dimming. The values of net capacitance and the corresponding values of lamp current are summarized in Table I below:

TABLE I

| Value of Net Capacitance in Secondary Circuit of Ballast Apparatus in Microfarads | Value of Lamp Current in Amperes |
| --- | --- |
| 4 | 0.444 |
| 3 | 0.332 |
| 2 | 0.217 |
| 1 | 0.116 |

It will be evident from a comparison of values of net capacitance and the corresponding values of lamp current that the magnitude of the lamp current can be effectively controlled by the net capacitance in the circuit to provide the requisite changes in lamp current for various levels of illumination. Although in FIGURE 1, I have shown a circuit arrangement in which the net capacitance is provided by capacitors connected in parallel circuit relation with each other, it will be appreciated that the net capacitance required for a preselected level may be introduced into the circuit by selectively switching into the circuit a single impedance element and switching out the impedance element used at the other preselected level of illumination.

An important advantage of the invention resides in the fact that the only component required in addition to the ballast apparatus 10 is a switch. The arrangement of the invention does not require any heat generating inductive devices such as autotransformers or variable reactors or complex electronic devices. It is particularly adaptable to such applications as residential lighting where only a limited number of levels of illumination are desired.

Referring now more particularly to the embodiment of my invention illustrated in FIGURE 3, a ballast apparatus is generally identified by reference number 40 and is shown enclosed in a dashed rectangle which schematically represents a ballast case 41 or other enclosure means. The ballast apparatus 40 includes a high reactance transformer 42 having a magnetic core 43, a magnetic shunt 44, a primary winding $P_1$ and a secondary winding $S_1$ inductively coupled therewith. A plurality of cathode heating windings $H_1$, $H_2$, $H_3$ are inductively coupled with the primary winding P to supply heating current to the filaments of lamps $L_1$ and $L_2$. A pair of input terminal leads 45 and 46 are provided for connection to power supply lines 47, 48 connected to suitable power supply (not shown).

Ballast apparatus 40 is shown connected in circuit with lamps $L_1$ and $L_2$, which are fluorescent lamps of the rapid start type and are positioned in close proximity to a grounded conductive fixture or plate 49 so that lamps $L_1$, $L_2$ are disposed in capacitive relationship therewith. The conductive fixture 49 is preferably at the same or nearly same potential as the low potential input lead 45 which is provided for connection to the grounded side of the power supply. Since it is generally required that the conductive fixture in which lamps $L_1$ and $L_2$ are disposed be grounded, it may be desirable but not necessary to connect the low potential side of the primary winding $P_1$ to the ballast case 41 through a high ohmage resistor (not shown), as is well known in the art.

Continuing further with the description of the ballast apparatus 40, it will be seen that the cathode heating windings $H_1$, $H_2$ and $H_3$ and the primary and secondary windings $P_1$, $S_1$ are connected in circuit with lamps $L_1$, $L_2$ by means of the output leads 50, 51, 52, 53, 54 and 55. Cathode heating winding $H_1$, which is an extension of the primary winding $P_1$, is connected in circuit with filament of lamp $L_1$ by leads 54 and 55. Cathode heating windings $H_2$, $H_3$ are connected externally in circuit with cathodes of lamps $L_1$, $L_2$ by leads 50, 51, 52 and 53. A starting capacitor $C_8$ is connected in circuit across lamp $L_2$ in a conventional manner to cause the open circuit voltage to be initially applied across lamp $L_1$. A capacitor $C_9$ may be connected across input terminal leads 45, 46 to suppress feedback that may cause radio interference.

In accordance with my invention, a pair of capacitors $C_6$ and $C_7$ are employed with a switching means, which in the illustrated embodiment of FIGURE 3 is single pole, single throw switch 56. Opening and closing the switch 56 causes fluorescent lamps $L_1$ and $L_2$ to be operated at a high and low level of illumination.

Turning now more specifically to the circuit connections of the capacitors, it will be noted that one end of capacitor $C_6$ is connected in circuit with the primary winding $P_1$ and the other end is connected in circuit with the secondary winding $S_1$ and to one end of the capacitor $C_7$. Capacitor $C_7$ has its other end connected to a lead 57, which is brought out externally of the ballast apparatus 40 and joined to a terminal 58 of switch 56. The other terminal 59 of switch 56 is connected to an electrical lead 60 joined in electrical circuit with the power supply line 47 which is connected to the grounded side of the power supply. The resistors $R_1$ and $R_2$ are bleeder resistors and causes the charge on capacitors $C_6$ and $C_7$ to be bled off when the ballast apparatus 40 is deenergized. It will be noted that when switch 56 is in the open position capacitor $C_7$ is disconnected from the lamp circuit ad only capacitor $C_6$ is connected in series circuit with the primary winding $P_1$ and the secondary winding $S_1$ across the lamps $L_1$ and $L_2$. When switch 56 is closed, the capacitors $C_6$ and $C_7$ are connected in parallel with each other and in series circuit relationship with the primary winding $P_1$ and the secondary winding $S_1$ across the lamps $L_1$ and $L_2$ or across output leads 50, 51 and 54, 55.

Although the switch 56 shown schematically in the embodiment of my invention illustrated in FIGURE 3 is a manually operated switch, it will be appreciated that this switch and the other switches I have shown may be electrically operated switches or driven solid state devices such as transistors or controlled rectifiers. For example, if it is desired in a particular application to operate the lamps $L_1$ and $L_2$ alternately at two levels of illumination, a switching means that periodically opens and closes at a predetermined rate may be employed. Further, it will be understood that although I have shown a ballast transformer 42 having a primary winding $P_1$ connected in autotransformer arrangement with the secondary winding $S_1$, an isolated secondary winding arrangement may also be used for energizing the lamp circuit as I have shown in the exemplification of my invention shown in FIGURE 5.

In FIGURE 4 I have illustrated a modification of the ballast apparatus 40 of FIGURE 3 wherein I have connected a small reactor 97 in series circuit with the capacitor $C_6$. The ballast apparatus shown in FIGURE 4 is generally identified by the reference numeral 98, and since essentially the same components were used in ballast apparatus 40 and 98, I have used the same reference numerals to identify the corresponding components thereof.

For low level operation of lamps $L_1$ and $L_2$ the switch 56 is open and the capacitor $C_6$ with a capacitance of .75 microfarad and a reactor 97 are connected in series circuit between the secondary winding $S_1$ and the primary winding $P_1$. The lamps $L_1$ and $L_2$ are operated at a high level by closing the switch 56 and placing the capacitor $C_7$ in parallel with the serially connected capacitor $C_6$ and reactor 97. The capacitor used in the illustrative exemplification of my invention had a capacitance of 2.95 microfarads. With the reactor 97 in series with the low-level capacitor $C_6$, it was found that it was possible to achieve a more stable operation of the lamps $L_1$ and $L_2$ at the lower dimming level.

Having more particular reference now to FIGURE 5, I have illustrated therein a ballast apparatus 70 embodying another form of my invention wherein the impedance elements in accordance with the invention are separately connected by a switch 71 in circuit with the ballast apparatus 70 to operate a pair of fluorescent lamps $L_1$ and $L_2$ at preselected levels of illumination and wherein a pair of resistors $R_3$ and $R_4$ are utilized at low levels of illumination. It will be seen that switch 71 places only one of the impedance elements $R_3$, $R_4$, $C_{10}$ or $C_{11}$ in series circuit with the secondary winding $S_2$ across lamps $L_1$ and $L_2$.

In this form of my invention the rotary switch 71 has a movable arm 72 which connects a plurality of terminals or stationary contacts 73, 74, 75 and 76 separately in electrical circuit with a terminal 77. It will be seen that the terminals 73, 74, 75 and 76 are connected in circuit with electrical leads 78, 79, 80 and 81 which are mounted to capacitors $C_{10}$, $C_{11}$ and resistors $R_3$, $R_4$. Thus, the switch 71 selectively connects terminal 77, which has a lead 82 mounted in circuit therewith, to either one of the four impedance elements $C_{10}$, $C_{11}$, $R_3$ or $R_4$ and places one of these elements in electrical circuit with the ballast apparatus 70 so that the lamps $L_1$ and $L_2$ can be operated at one of the four preselected levels of illumination.

When the switch 71 is in the position shown in FIGURE 5 with the movable arm 72 engaging terminal 73, capacitor $C_{10}$ is connected in circuit, and ballast apparatus 70 provides sufficient lamp current to operate the lamps $L_1$ and $L_2$ at a first or normal level of illumination. An intermediate level of illumination is provided when the movable arm 72 is rotated in a counterclockwise direction as viewed in FIGURE 5 and brought into engagement with terminal 74. In this position of the switch, capacitor $C_{11}$ is connected in circuit and all of the other impedance elements are disconnected. The lowest two levels of illumination are provided by connecting the resistor $R_3$ and $R_4$ in circuit. It was found that the lamps $L_1$ and $L_2$ can be operated more stably at low levels of illumination by using a resistive impedance rather than a capacitive reactance in the circuit.

The ballast apparatus 70 shown in FIGURE 5 is enclosed in a dashed rectangle which schematically represents a ballast case or enclosure 83. The lamps $L_1$ and $L_2$ are disposed in proximity to a grounded conductive fixture 84. Although a pair of lamps $L_1$ and $L_2$ are shown in the illustrated embodiment of the invention, it will be apparent to those skilled in the art that the invention can be incorporated in a ballast for operating one lamp or more than two lamps.

To provide the required voltage transformations, a high reactance ballast transformer 85 is employed. It has primary winding $P_2$ connected across input terminal leads 86, 87, a magnetic core 88, the secondary winding $S_2$, and a magnetic shunt 89 which is interposed between the secondary winding $S_2$ and the primary winding $P_2$. As in the other ballast circuits described herein, cathode heating windings $H_1$, $H_2$ and $H_3$ are inductively coupled with the primary winding and provide continuous heating current for the filaments of lamps $L_1$ and $L_2$ during starting and operation. The output of ballast apparatus 70 is applied across the serially connected lamps $L_1$ and $L_2$ by output leads 90, 91, 92, 93, 94 and 95. A starting capacitor $C_{12}$ is connected across lamp $L_2$ to initially apply the open circuit voltage across lamp $L_1$, which is the first lamp to be fired.

The starting of the fluorescent lamps $L_1$ and $L_2$ is accomplished by the apparatus shown in FIGURES 1, 3, 4 and 5 in a conventional manner. The open circuit voltage output is applied initially across lamp $L_1$ since a starting capacitor is provided to shunt lamp $L_2$ during the starting condition. Starting of lamp $L_1$ is also aided by a small auxiliary current flow between a filament of lamp $L_1$ and the conductive fixture disposed in capacitive relationship therewith. After lamp $L_1$ has started, the voltage across the starting capacitor is sufficient to start lamp $L_2$. Once both lamps $L_1$ and $L_2$ have started, the impedance presented by the starting capacitor is relatively greater than the lamp impedance and consequently current through the starting capacitor is negligibly small during operation.

From the foregoing description of the operation of the various switching arrangements and the ballast apparatus used in conjunction therewith in accordance with the present invention, it will be apparent that it is possible to operate one or more fluorescent lamps at preselected levels of illumination by a switching means which causes impedance elements in the ballast apparatus to be connected and disconnected as required. Installation of the ballast apparatus and system of the invention is simplified since heat generating units such as dimming controls, autotransformers and variable reactors do not have to be installed at locations remote from the ballast apparatus. Also, the present arrangement makes it possible to provide a relatively inexpensive means for dimming fluorescent lamps as compared with other means known to me.

It will be understood that the specific embodiments of the invention which I have described herein may be changed or varied without departing from the principle of the invention. For example, the location of the impedance elements in the ballast apparatus can be readily changed and the invention can be incorporated in a ballast apparatus for operating one or more than two fluorescent lamps. It is to be understood, therefore, that I intend by the appended claims to cover all such changes and modifications that fall within the true spirit and scope of the invention.

What I claim as new and desire to secure by Letters Patent of the United States is:

1. A ballast apparatus for use in conjunction with a switching means for operating a fluorescent lamp at different predetermined levels of illumination, said ballast apparatus comprising a housing, a high reactance transformer connected in said housing and including a primary winding and a secondary winding inductively coupled on a magnetic core, and means for applying the output of said transformer to the fluorescent lamp for operating the lamp at said predetermined levels of illumination, said means including output leads extending out of said housing for connection to the lamp, a plurality of capacitance elements positioned in said housing, and connections for placing said capacitance elements in series circuit relationship with said secondary winding across said output leads, said connections including at least one lead connection to at least one of said impedance elements and extending externally of said housing for placing said switching means in series circuit relationship with said at least one of said capacitance elements whereby said one capacitance element and said secondary winding across said output leads may be selectively placed in the circuit with said secondary winding across said output leads to vary the energy applied to said lamp and control the degree of illumination thereof.

2. A ballast apparatus for use in conjunction with a switching means for operating a fluorescent lamp at different predetermined levels of illumination, said ballast apparatus comprising a housing, a high reactance transformer connected in said housing and including a primary winding and a secondary winding inductively coupled on a magnetic core, and means for applying the output of said transformer to the fluorescent lamp for operating the lamp at said predetermined levels of illumination, said means including output leads extending out of said housing for connection to the lamp, a plurality of capacitance elements positioned in said housing, and connections for placing said capacitance elements in parallel branches with respect to each other and in series circuit relation with said secondary winding across said output leads, said connections including a plurality of leads extending externally of said housing for placing said switching means in series circuit relation with one of said capacitance elements in said parallel branches and said secondary winding across said output leads whereby the last mentioned one of said capacitance elements may be selectively placed in the circuit with said secondary winding across said output leads to vary the energy applied to said lamp and control the degree of illumination thereof.

3. A ballast apparatus for operating a pair of fluorescent lamps from an alternating power supply at a high and low level of illumination, a switch having a first terminal connected to one side of the alternating power supply and having a second terminal, said first and second terminals being joined when said switch is closed, said ballast apparatus comprising a high reactance transformer having a primary winding and a secondary winding inductively coupled therewith on a magnetic core, means including output leads for applying the output of the ballast apparatus to the fluorescent lamps a pair of input leads for connection to the alternating power supply, said primary winding of the high reactance transformer being connected across said input leads, a first capacitor connected in series circuit relationship with said secondary winding and one of said input leads, a second capacitor having one end thereof connected in circuit with the first capacitor and a lead which is brought out externally of said apparatus for connection to the second terminal of said switch, said switch when closed connecting said second capacitor in series circuit with said secondary winding and said one side of the alternating power supply and in parallel circuit with said first capacitor and providing a net capacitive reactance in the secondary circuit of the ballast transformer sufficient to cause the lamp to be operated at a first level of illumination, a second preselected level of illumination being provided when said switch is opened and said second capacitor is disconnected from said one side of the alternating power supply.

4. A ballast apparatus for operating at least one fluorescent lamp from an alternating power supply at preselected levels of illumination, said fluorescent lamp being changed from one level of illumination to another level by a switching means having a plurality of terminals, said ballast apparatus comprising a high reactance transformer having a primary winding and an isolated secondary winding inductively coupled therewith on a magnetic core, a pair of input terminal leads for connection with the alternating power supply, said primary winding being connected across said input terminal leads, at least one capacitor having one end thereof connected in circuit with a first end of said secondary winding, at least one resistor having one end thereof connected to said first end of the secondary winding, the other end of said capacitor and the other end of said resistor having leads brought out externally for connection to terminals of the switching means for selectively connecting said capacitor and said resistor in a lamp operating circuit with said secondary winding, circuit means including a plurality of output leads for applying the output of the apparatus across a lamp, one of said output leads being connected to the second end of said secondary winding and brought out externally for connection in circuit with a lamp, another of said output leads having one end brought out for connection to a lamp and having the other end thereof brought out for connection in circuit with said switching means, said resistor when switched in series circuit relation with said secondary winding providing sufficient impedance to limit the current supplied at said output leads to operate the lamp at a preselected level of illumination and said capacitor when switched in series circuit relation with said secondary winding providing a net capacitive reactance in the lamp operating circuit to operate said lamp at a second preselected level of illumination.

5. A ballast apparatus for operating a pair of fluorescent lamps from an alternating power supply at two preselected levels of illumination by means of a manually operated switch having a first terminal adapted for connection to the grounded side of the power supply and a second terminal for connection in circuit with the apparatus, said ballast apparatus comprising a ballast transformer having a primary winding for connection with the power supply and a secondary winding inductively coupled therewith on a magnetic core, a first capacitor connected in series circuit relation with the secondary winding and the grounded side of the primary winding, a second capacitor having one end thereof joined in electrical circuit with said first capacitor, the other end of said second capacitor having an electrical lead connected thereto and extending externally of said ballast apparatus for connection to the second terminal of said switch, circuit means including a starting capacitor and a plurality of output leads for connecting at least the secondary winding of the ballast transformer and the starting capacitor in circuit with the fluorescent lamps, said second capacitor when switched in and out of series circuit relation with said secondary winding providing a first and second level of illumination.

6. A system for operating a plurality of fluorescent lamps at preselected levels of illumination from an alternating power supply comprising a ballast transformer having a primary winding and a secondary winding inductively coupled therewith on a magnetic core, circuit means including electrical leads for supplying the output current of at least the secondary winding of the ballast transformer to said fluorescent lamps, a plurality of capacitance elements, and circuit means for selectively connecting said capacitance elements in series circuit relation with said secondary winding and said lamps and in parallel circuit relation with each other to provide the lamp current required to operate the lamps at said preselected levels of illumination.

7. A system for operating a pair of serially connected fluorescent lamps at two predetermined levels of illumination from an alternating current supply comprising a high reactance ballast transformer having a primary winding and a secondary winding inductively coupled therewith on a magnetic core, a first and a second input terminal leads, said primary winding being connected across said first and second input terminal leads, said first terminal lead being connected to the grounded side of the power supply and said second input terminal lead being connected to the ungrounded side of the power supply, a first capacitor connected in circuit with the end of the primary winding connected to said first input terminal lead and in series circuit relation with the secondary winding, a second capacitor having one end thereof connected in series circuit with said secondary winding, a switching means connected in circuit with the other end of said second capacitor and in electrical circuit with the grounded side of the alternating power supply, circuit means including a starting capacitor and plurality of electrical leads connecting said starting capacitor in shunt with one of said pair of fluorescent lamps and connecting at least the secondary winding of said high reactance transformer in circuit with the serially connected fluorescent lamps, said switching means when closed causing said lamps to be operated at one predetermined level of illumination and when opened causing said lamps to be operated at a second predetermined level of illumination.

References Cited

UNITED STATES PATENTS 2,886,133  12/1958  Strange et al. _____ 315—95
3,080,503  3/1963   Brooks _____ 315—187

FOREIGN PATENTS 397,000  8/1933  Great Britain.

JOHN W. HUCKERT, *Primary Examiner.*

D. O. KRAFT, A. J. JAMES, *Assistant Examiners.*

UNITED STATES PATENT OFFICE

CERTIFICATE OF CORRECTION

Patent No. 3,323,013                                    May 30, 1967

Harold W. Lord

It is hereby certified that error appears in the above numbered patent requiring correction and that the said Letters Patent should read as corrected below.

Column 8, line 14, for "impedance" read -- capacitance --; column 8, line 17, after "elements" insert -- and said secondary winding across said output leads --; lines 18 and 19, strike out "and said secondary winding across said output leads --.

Signed and sealed this 1st day of October 1968.

(SEAL)

Attest:

Edward M. Fletcher, Jr.                                  EDWARD J. BRENNER

Attesting Officer                                             Commissioner of Patents